(12) United States Patent
Raghuprasad

(10) Patent No.: US 7,687,941 B2
(45) Date of Patent: Mar. 30, 2010

(54) CORDLESS POWER TRANSFER

(76) Inventor: Puthalath Koroth Raghuprasad, 2400 E. 8th St., Odessa, TX (US) 79761

( * ) Notice: Subject to any disclaimer, the term of this patent is extended or adjusted under 35 U.S.C. 154(b) by 239 days.

(21) Appl. No.: 12/060,970

(22) Filed: Apr. 2, 2008

(65) Prior Publication Data
US 2009/0251113 A1    Oct. 8, 2009

(51) Int. Cl.
*G05F 3/06* (2006.01)
(52) U.S. Cl. .................................................. 307/151
(58) Field of Classification Search .................. 307/151
See application file for complete search history.

(56) References Cited

U.S. PATENT DOCUMENTS

| | | | |
|---|---|---|---|
| 4,209,259 A | 6/1980 | Rains et al. | |
| 4,575,255 A | 3/1986 | Kafka | |
| 4,591,777 A | 5/1986 | McCarty et al. | |
| 4,739,242 A | 4/1988 | McCarty et al. | |
| 5,765,796 A | 6/1998 | Lanus | |
| 7,228,593 B2 | 10/2003 | Conrad | |
| 6,712,497 B2 * | 3/2004 | Jersey et al. | ................ 366/274 |
| 6,860,764 B2 | 3/2005 | Khoury | |
| 7,068,991 B2 | 6/2006 | Parise | |
| 7,235,909 B2 | 6/2007 | Moe | |
| 7,249,805 B2 | 7/2007 | Cap | |

FOREIGN PATENT DOCUMENTS

| | | |
|---|---|---|
| JP | 2006141489 | 6/2006 |
| WO | 03096361 | 11/2003 |

\* cited by examiner

*Primary Examiner*—Robert L. Deberadinis
(74) *Attorney, Agent, or Firm*—David L. King

(57) ABSTRACT

A system for cordless transfer of power for appliances or electronic devices 30 has a power transferring device 80 with a plurality of magnets 52 driven by a motor 70B powered by commercial electric power devices or lines. The power transferring device 80 is positioned below a table or countertop 20. On the undersurface of each appliance or electronic device 30 are one or more circular rotating magnetic arrangements 52 with opposing (attraction) poles to drive a dynamo 40 or dynamos. When the motor 70B is switched on, the drive axle 72 rotates a support base 82 upon which a plurality of magnets 52 is attached about an axis which correspondingly moves the plurality of magnets 52 in a circular motion creating a rotating magnetic field 50 to turn the dynamo 40 inside the base of the cordless appliance or electronic device 30.

3 Claims, 5 Drawing Sheets

CORDLESS POWER TRANSFER

TECHNICAL FIELD

This invention relates to a system for transferring power across surfaces from an electrical power source to appliances and devices without the use of cords.

BACKGROUND OF THE INVENTION

The present use of electronic devices or appliances requires the use of numerous electric outlets strategically spaced either along the adjacent walls below tables and desk units or extending above wall mounted countertops or in the vertical sides of island type counters. Often a personal desktop computer, laptop computer or a docking station for a laptop is placed on a table or work station and numerous electronic devices such as a copier, scanner, fax machine are electronically connected to the computer via a variety of wires such as USB cables and the like. To remedy this collection of cable connections many of the support or peripheral devices have ban designed to wirelessly connect to the computer. While this eliminates the cabling, each device still needs electrical power cords that are plugged into outlets directly or into an electrical surge protector which plugs into the outlet. This thus leaves the devices with cords that are both unsightly and cumbersome. A similar problem exists in the use of entertainment centers wherein televisions, stereos, DVD, satellite or cable box and the like have to be electronically powered.

In the kitchen area of a residential home a number of household appliances are used. Each appliance has a power cord that has to plug into an electrical outlet. Normally, these countertops found in residential kitchens include sinks used for washing dishes with some sinks including garbage disposal units for removal of food scraps.

The combination of water and electrical appliances connected to power outlets causes some risk not the least of which includes electrocution, should such a device accidentally fall into a water filled sink.

Secondly, the available space or surface area on countertops is always at a premium. Accordingly, many appliances are suspended below cabinets to free up space such as microwave ovens and can openers and the like.

Other appliances such as food processors, blenders, coffee makers, waffle makers, crock pots, cake mixers among a few that simply are best used when sitting on a fat countertop surface.

Since countertop space is at a premium, some inventors have suggested making cordless appliances that plug into electrical connectors in a supporting base unit as is taught in U.S. Pat. No. 6,860,764 B2. The base unit has two of more appliances. The base unit sits on the countertop and is plugged into a conventional outlet. The concept, while clever, simply occupies a large portion of a countertop with a rather unsightly additional appliance one could call a power source.

Assuming a homeowner pays several thousand dollars on natural granite or marble countertops or on beautiful synthetic countertops, the thought of blanketing such counters with large connector base units seems unimaginable and accordingly such a concept has not been readily accepted. Secondarily, the connectors of the base units must be elevated to avoid splash of water from entering and providing another source of electrical shocks.

Ideally, the use of such appliances could be made cordless by the use of battery powered electrical appliances; however, this too is impractical in most cases because the power drainage from appliances having heating elements such as a coffee maker or toaster are simply too much for rechargeable battery powered type devices.

In the case of electronic devices like computers, TVs and their peripheral devices, damage losses due to power surges created by electrical storms or outages is a major cost that can only be partially recovered if at all by insurance.

The present invention provides an active power supply without any of the negative features described above. The concept simply leaves the entire countertop or table surface free of electrical cords connected to plugs when powering a device or appliance. No wires, cords or exposed electrical connections are present, above, on or near the user of the device or appliance when using the invention. The appliances and devices have no power cords. The invention, which is described below, is believed to eliminate any source of electrical power surges that could damage or destroy the appliance or device.

SUMMARY OF THE INVENTION

A system for cordless transfer of power for appliances or electronic devices has a power transferring device with a plurality of magnets driven by a motor powered by commercial electric power devices or lines. The power transferring device is positioned below a table or countertop. On the undersurface of each appliance of electronic device are one of more circular rotating magnetic arrangements with opposing (attraction) poles to drive a dynamo or dynamos. When the motor is switched on, the drive axle rotates a support base upon which a plurality of magnets is attached about an axis which correspondingly moves the plurality of magnets in a circular motion creating a rotating magnetic field to turn the dynamo inside the base of the cordless appliance or electronic device. When the appliance or electronic device is placed in or near a designated lotion on the table or the countertop, the motor starts rotating the plurality of magnets attached to the axle of the motor which starts rotating the axle of the dynamo inside the device or appliance, through the mutual attraction of the magnets connected to the axle of the motor to the magnets connected to the axle of the dynamo, thus the need for cords is eliminated. Power to the motor of the transfer device is channeled through wiring hidden or concealed in the legs of the table or under the countertop.

The power transfer system for cordless appliances or electronic devices has a power transferring device for emitting a rotational magnetic field from below a table or countertop to above a surface of the table or countertop; and a cordless appliance or electronic device having a base for sitting on a surface of a countertop or table top. The appliance or electronic appliance has a base that houses a dynamo for transferring an electric current. The dynamo is driven by the rotating magnetic field of the power transfer device. The power transfer device for transferring power to a cordless appliance or electronic device has an electric drive motor with a drive axle; a switch for activating the drive motor; a rotatable support base connected to the drive axle, the rotatable support base having a plurality of magnets positioned about spaces of the base; and a housing for holding the motor and rotatable support base and for attaching to the underside of the table or countertop. The cordless appliance or electronic device has a base for sitting on a countertop or table; a plurality of magnets positioned on a rotatable support structure inside the base; a dynamo for providing electric current, housed inside the appliance or electronic device and connected to the rotatable support structure. When the appliance or electronic device is placed over or on the rotating magnetic field, the rotatable support structure rotates causing the dynamo to generate an electric current to power the appliance or electronic device.

DETAILED DESCRIPTION OF THE INVENTION

Figure 5:
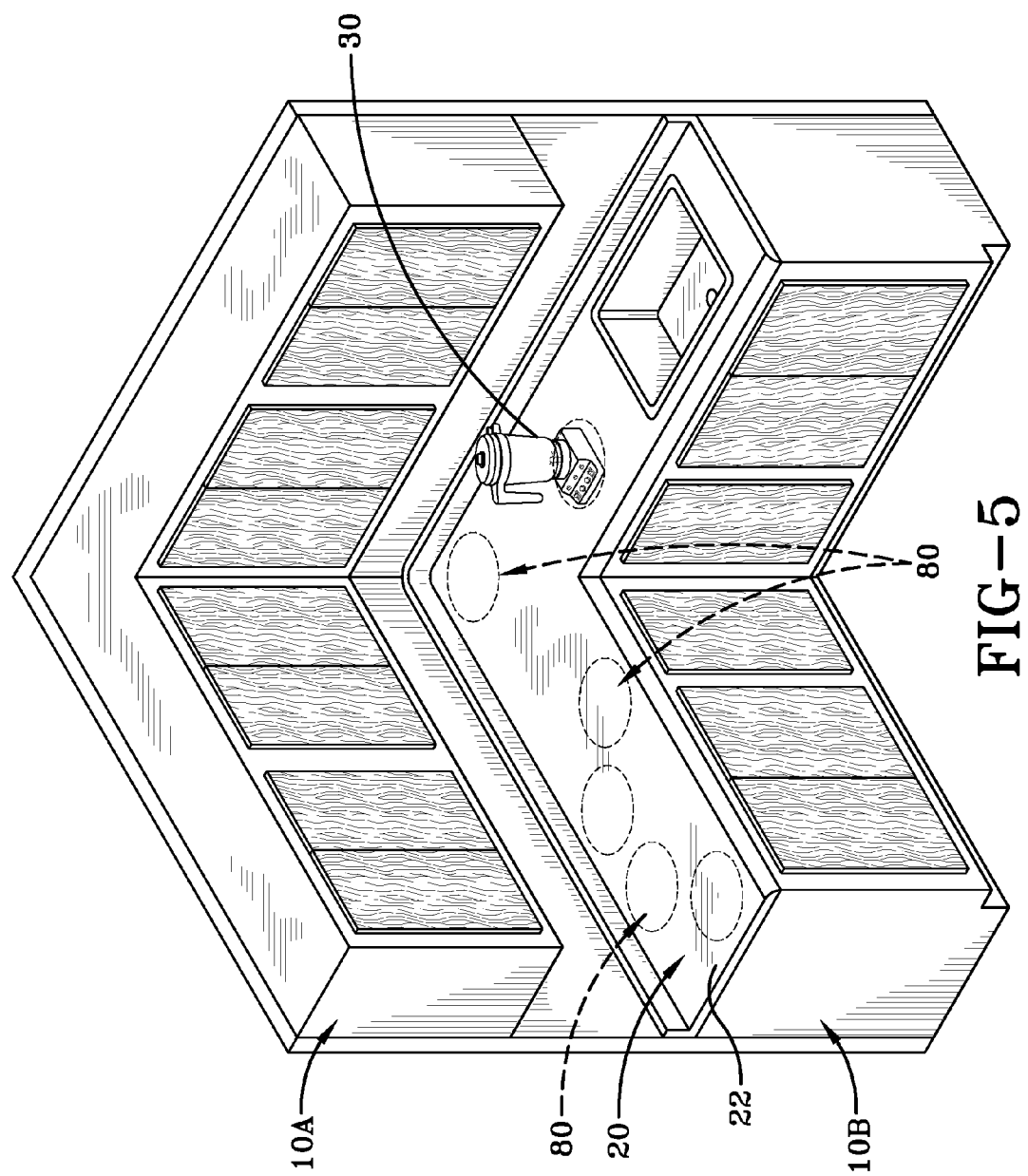
FIG. 5 is a perspective view of an exemplary countertop employing the power transfer system of the present invention to transfer the power to an exemplary appliance.

With reference to FIG. 5, an exemplary kitchen with cabinets 10A and 10B having a countertop 20 is shown employing the power transferring devices 80 of the present invention. As shown, the countertop 20 has a smooth top surface 22 upon which sits an exemplary cordless appliance 30 made in accordance with the present invention.

Figure 6:
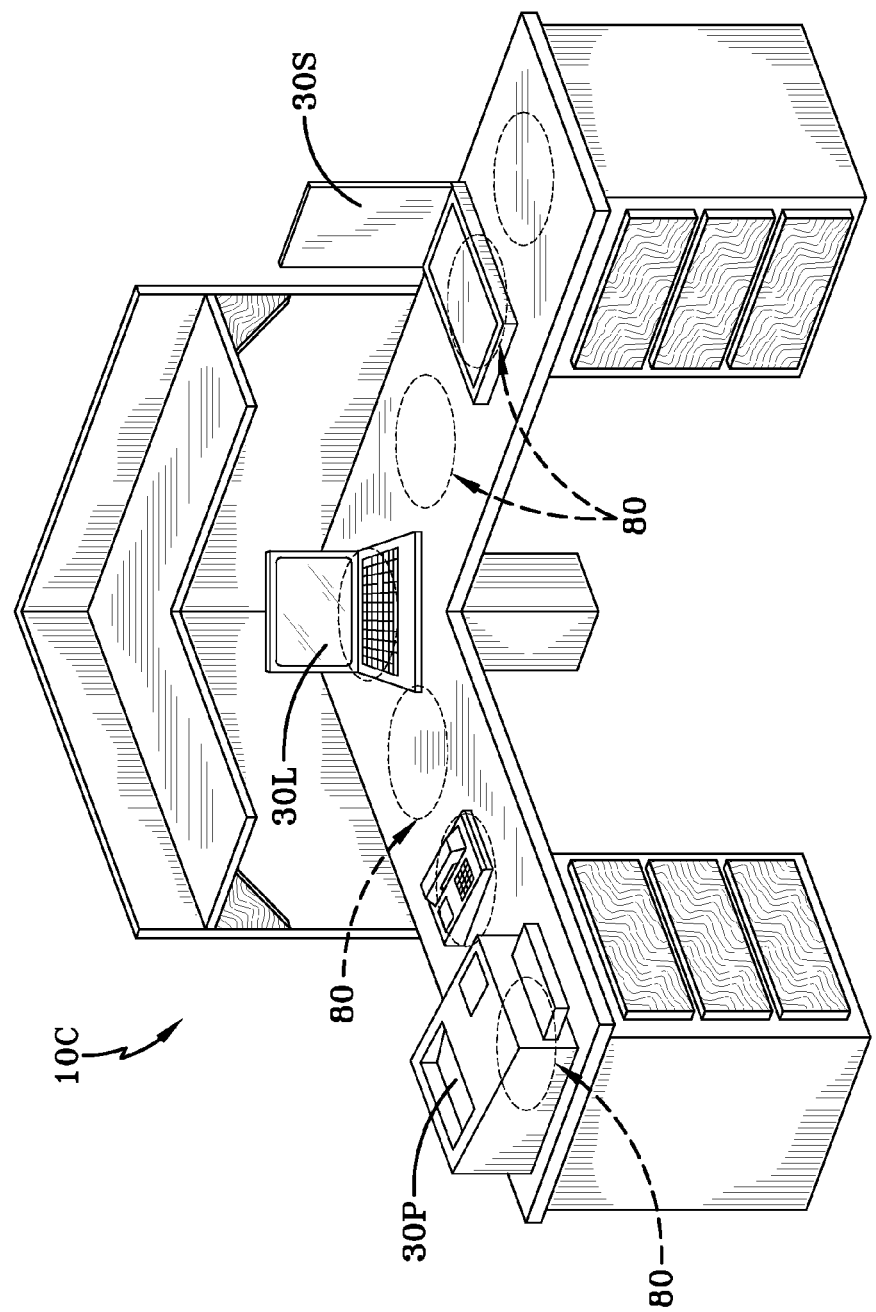
FIG. 6 is a perspective view of an exemplary computer work station employing the device of the present invention to transfer power to several power transfer system exemplary electronic devices.

With reference to FIG. 6 of an exemplary computer work station 10C is shown having a copier/fax machine 30P, laptop computer 30L and a scanner 30S each powered by a power transferring device 80 of the present invention. The use of the present invention is equally applicable to electronic devices 30 and kitchen appliances 30 and throughout this description the term appliance 30 equally applies to these electronic devices 30.

Figure 1:
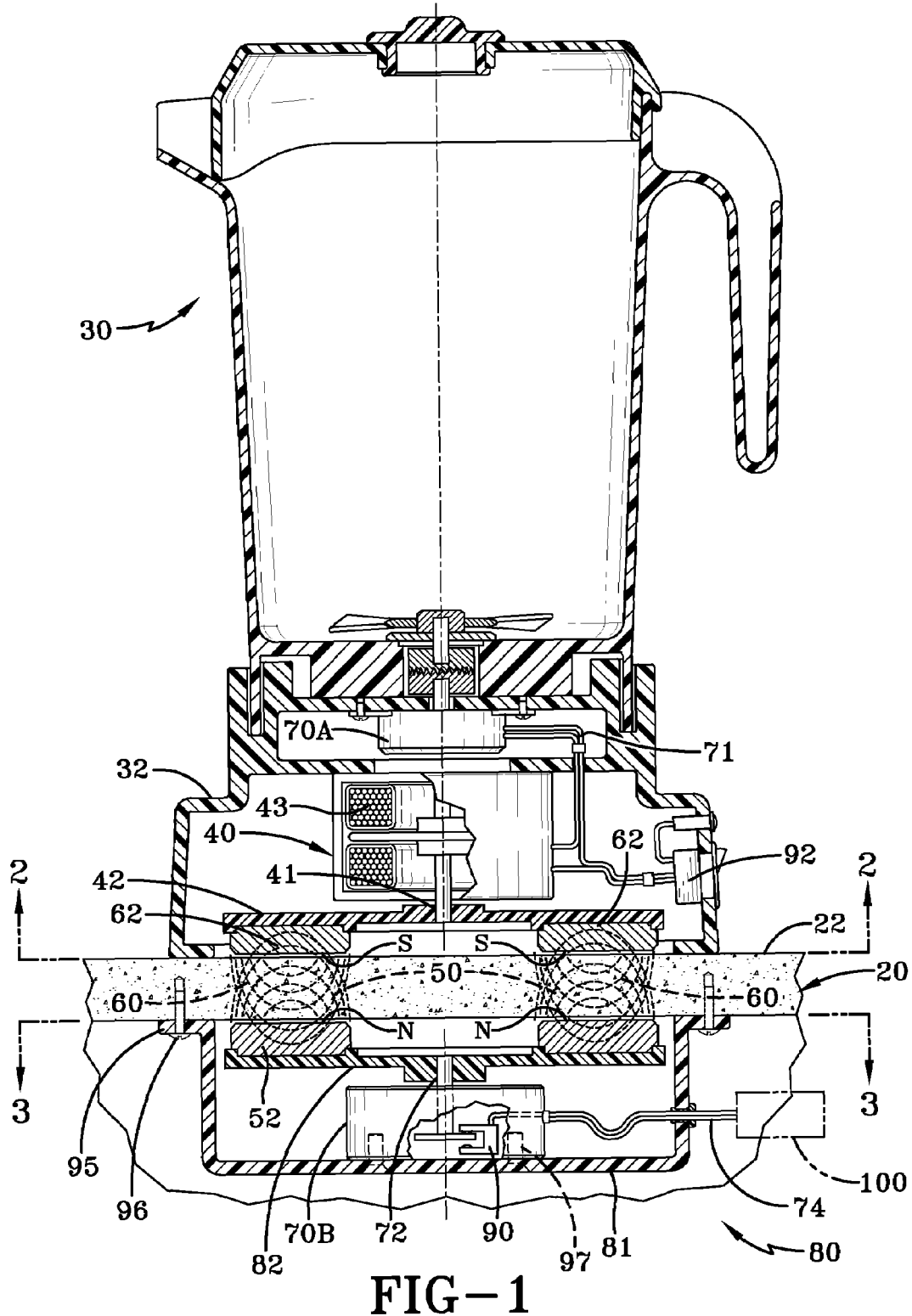
FIG. 1 is a sectional view of the power transfer system for cordless appliances and a cordless appliance according to the present invention.
Figure 2:
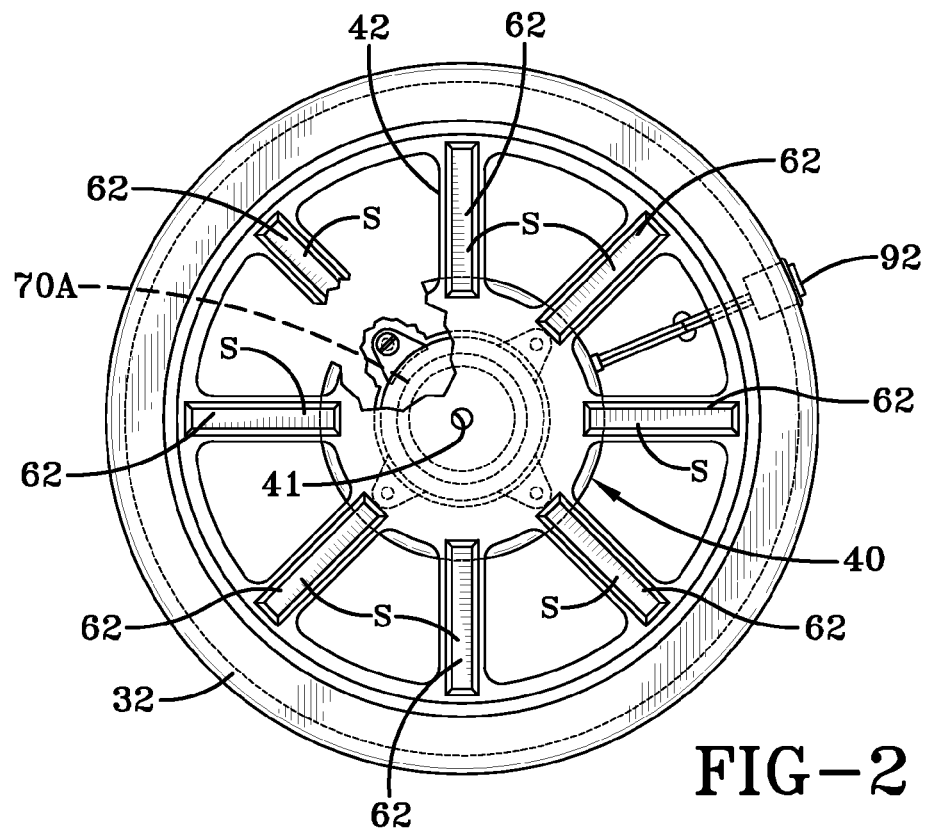
FIG. 2 is an enlarged view of the base of a cordless appliance taken along line 2-2 of the present invention.

The cordless appliance 30 as illustrated in FIG. 1 has a lower base 32 that sits on the countertop surface 22. The lower base 32 has no wiring or power cords for connecting to external power outlets. All of the electrical power needed to operate the appliance 30 is transferred within the appliance 30 by a dynamo 40 as shown in FIGS. 1 and 2. The dynamo 40 is housed inside the lower base 32 and has an axle 41 connected to a rotatable support structure 42. The rotatable support structure 42 turns in response to a moving magnetic field 50. The magnetic field 50 is circularly moved about a circular axis. The field 50 originates below the countertop surface 22 and extends through that surface 22 a short distance above the countertop. The attractive forces of the magnetic field 50 generated by the N pole facing magnets 52 interact with opposing of oppositely S pole facing magnets 62 that emit magnetic fields 60 emanating from the magnets 62 on the support structure 42. As shown, this magnetically links the magnetic field 60 of the appliance 30 with the circularly moving magnetic field 50 which interacts with the corresponding member of the appliance/device 30 causing the rotatable support structure 42 to rotate at the same rotational speed of the rotating magnet field 50. This in turn rotates the axle 41 in the dynamo 40 which is connected to the rotatable support structure 42. The axle 41 drives the internal structure 43 of the dynamo 40 to generate an electric current. The electric current from the dynamo 40 passes through the wire 71 and is then used to power an electric motor 70. The appliance 30 which is responsive to the rotating magnetic field 50 transfers its own electricity internally being completely isolated from any other electrical connection and without requiring any batteries or similar type power sources.

As illustrated, the aesthetic beauty of the countertop surface 22 is maintained and no exposed holes or other surface openings are required to detract from the beauty of the countertop surface 22.

As shown in FIG. 1, the power transfer system has a power transferring device 80 hidden from sight under the countertop 20. The device 80 is housed in a housing structure 81 attached to the countertop by fasteners 96 extending through holes 95. Alternatively, the power transferred/generated within the appliance or device 30 can be stored in batteries.

Figure 3:
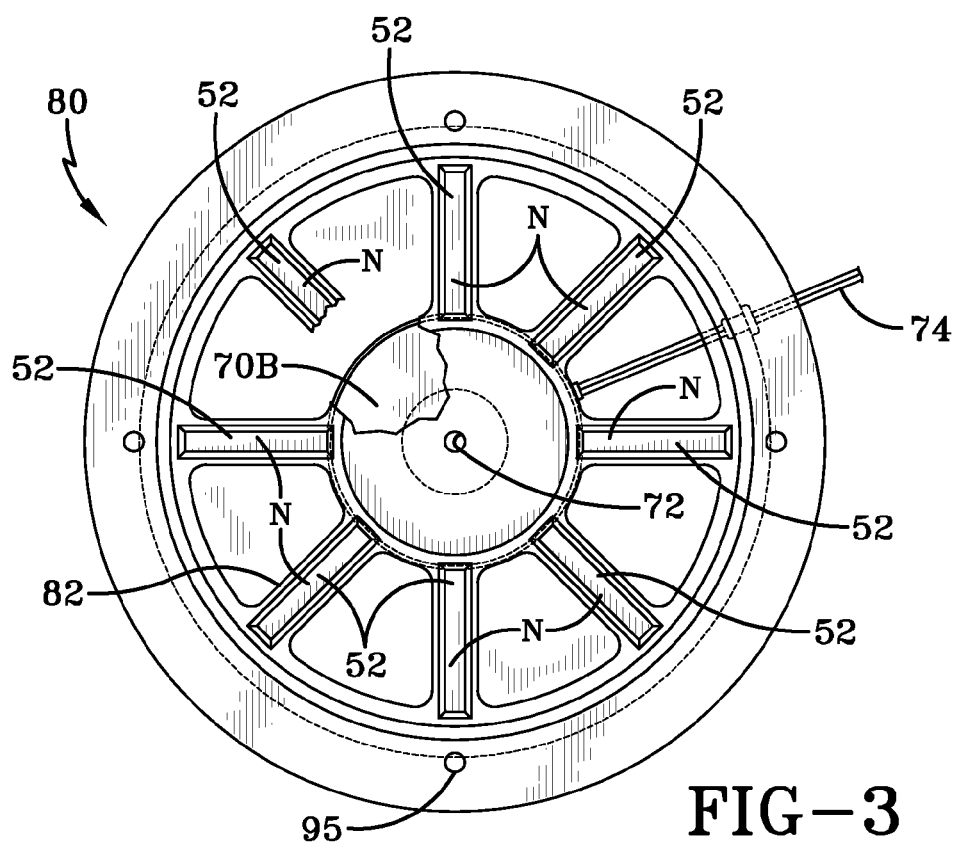
FIG. 3 is an enlarged view of the power transferring device taken along lines 3-3 of FIG. 1.
Figure 4:
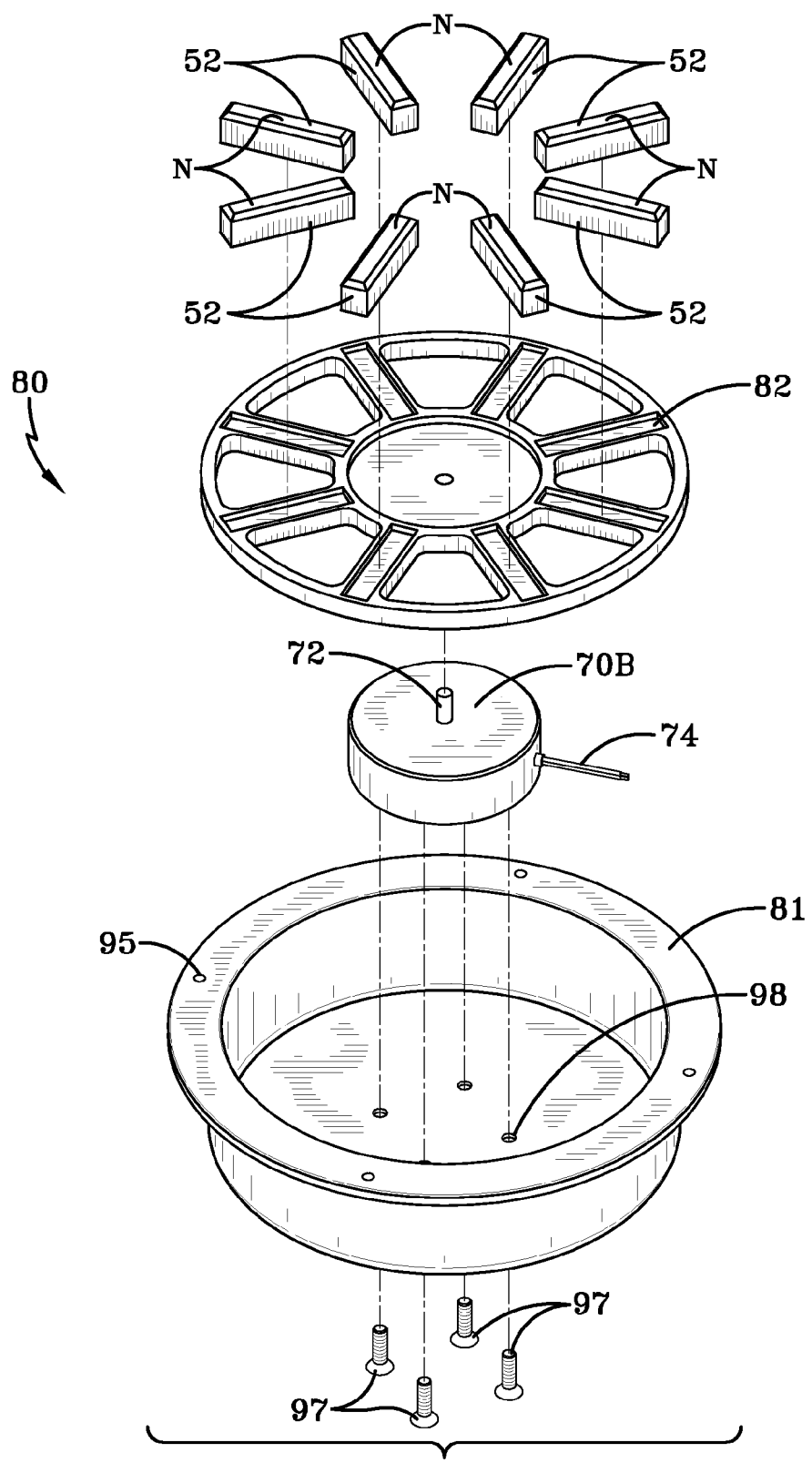
FIG. 4 is an exploded view of the power transferring device.

As illustrated in FIG. 3, the rotatable support base 82 which as a plurality of magnets 52 positioned in a radial extending pattern like spokes on the base 82. The support base 82 is connected to a drive axle 72 of an electric motor 70B. The motor 70B is fixed to the housing structure 81 by fasteners 97 extending through the holes 98 as shown in the view of FIG. 4. The electric motor 70B is wired or connected to a power supply or plug outlet 100 via the power line 74. A switch 90 is used to activate the motor 70 which rotates the drive axle 72 to spin the support base 82 in a circular motion about the axle 72 causing the magnets 52 to move to generate a circular moving magnetic field 50. When an appliance 30 is set over the magnetic field 50 the attractive forces of the magnetic fields 60 and 50 move the base structure 82 with the magnets 52 pulling the entire structure 82 upward closing the switch 90 causing the motor 70B to activate and start rotating the base structure 82.

As further shown in FIG. 1, the orientation of the magnets 52 is such that the magnetic fields 50 are having a north pole orientation directed to point towards and through the countertop surface 22. Preferably the magnets 52 are spaced at a sufficiently large diameter to achieve mechanical advantage to move the rotatable support structure 42 of the appliance 30.

As shown in FIG. 1, the rotatable support structure 42 has the magnets 62 attached and positioned at a distance equal to the center of rotation of the rotating magnetic field 50 of magnets 52 under the countertop 20.

As shown the appliance 30 and the underlying power transferring device 80 do not require precise alignment; however, it is preferred that the opposing magnetic fields 50 and 60 are such that the centers of rotation are located in reasonably close proximity. By having the appliance magnets 62 set at a distance from the center of rotation an effective mechanical advantage is created to assist in rotating the rotatable support structure 42. Each magnet 62 adds to the coupling forces with a magnet 52 on the underlying support base 82. The pairs of magnets 62 and 52 align. As shown there are eight spokes, each spoke has a magnet 52. Aligned over these magnets 52 and spaced therefrom by the countertop or table are a similar number of magnets 62 on spokes integral to the support structure 42. As previously mentioned, when the appliance 30 is set over the magnets 52 the attractive forces of the magnetic fields 50, 60 pull the base structure 82 and axle 72 upwardly closing the switch 90 and activating the motor 70B. This causes the axle 72 to turn rotating the base structure 82 and creating a rotating magnetic field 50. The magnetic field 50 has a peak attractive force field above each magnet 52 and between the spokes the magnetic forces are less. This feature creates a noncontacting clutch-like attachment of the pairs of magnets 62 and 52. As the speed of rotation accelerates the rotation of the axle 41, the internal mechanisms 43 of the dynamo 40 are driven to generate an electric current. This electric current can be passed through the wires 71 to power an appliance motor 70A to operate the appliance.

The sped of rotation of the rotating base structure 42 can slip relative to the underlying rotational speed of the magnets 52 if the speed of rotation of the axle 72 of the motor 70B exceeds the ability of the attractive forces of the magnetic pairs 62, 52 to maintain alignment. If this occurs, the rotating magnetic field will continue to provide a positive rotational force on the rotating magnets 62 of the appliance. This feature of enabling the rotating support structure 42 to slip at a rotational speed based on the inertial resistance of the dynamo 40 means that the underlying drive motor 70B can be rotated at any desired speed and the appliance can either match that speed by maintaining the alignment of the magnetic pairs 62 and 52 or the magnets 62 can slip relative to the underlying magnets 52 and will nevertheless be moved by the next adjacent magnet 52. This ability to compensate for the slippage permits its an automatic way to control the speed of rotation and the power generation in the dynamo 40. Each appliance 30 can be made with voltage and current regulators or transformers to insure the motors or elements needed to operate the device or appliance are properly regulated as is the current practice using conventional a/c power or d/c power devices. The appliance or device 30 simply houses its own internal power generating capability which is driven by the rotating magnetic field 50 as described above.

In a preferred embodiment, the appliance 30 may further include a plurality of lights and sensor (not shown) that sense the presence of the magnetic field 50 so the placement can be centered without having any marks on the table top or surface. These optional lights turn red to yellow to green to reflect the proximity of the magnetic field 50.

As further shown once placed over the magnetic field 50 the appliance 30 can be operated by pressing any of the button switches 92 commonly employed on such appliances or electronic devices. The ability to eliminate power cords enhances the appearance, but also eliminates the occurrence of power surges so common in using electronic devices connected to conventional a/c power outlets.

With reference to the sectional view of FIG. 1, the appliance 30 is shown sitting on the surface 22 of the table or countertop 20 with the power transferring device 80 attached to the underside of the countertop or table 20. The resistance to the transmission of magnetic fields 50 through the countertop surface can be reduced by providing a counterbore (not shown) on the underside of the table or countertop to reduce the thickness between the two sets of opposing magnets 62 and 52 such that the transmission of the magnetic fields 50 and 60 will be sufficient to create an attractive force that will be able to rotate the support structure 42. In many cases the materials used may be capable of transmitting magnetic fields with great ease, in which case there is no need for a counterbore and the magnet 52 can provide sufficient driving force through the countertop or table-thickness; to provide for the necessary rotation to power the appliance 30. In some cases synthetic materials are used through which magnetic fields 50, 60 can easily be transferred. In other cases wherein the material is a natural granite or concrete, the transmission can be reduced dramatically. For that reason in those instances it is preferable that the rotating support structure 42 and base structure 82 each have magnets on both the appliance 30 and on the power transferring device 80 such that two magnetic fields 50, 60 transmitting towards the other provide attractive forces such that the rotation of the lower magnets 52 will also provide a rotation by a link up of the two magnetic fields 60 and 50 can be transmitted through the table or countertop 20. In some cases countertops may be metal or stainless steel in which case this system will not be usable without providing a surface through which the magnetic fields can pass. As an alternative to the permanent magnets 52 shown on the power transferring device 80 electromagnets can be provided such that the force of the magnetic field 50 is increased sufficiently to transfer the magnetic field 50 through the thickness of the table or countertop 20 to which the power transferring device 80 is attached.

A further alternative embodiment can be employed wherein the magnets 62 on a support structure 42 of the appliance or electronic device can be substituted with simple metal material, this metal material will be responsive to magnetic forces, it can be iron or steel or any other material in which good magnetic attractions can occur. In such a case where an even lower magnetic field is required to provide sufficient rotation of the rotating support structure 42 to turn the axle 41 of the dynamo 40 to transfer electricity for the appliance or electronic device 30. These and other alternative configurations are possible with the appliance or device 30 with the primary principle being that the magnetic field 50 being transmitted must be sufficiently strong to provide a rotational movement of the supporting base structure 42 such that the dynamo 40 can be activated to transfer electric current to power the appliance or device 30.

A further refinement of the invention may include permanent magnets with the provision of conductive coils wound around them in such a way to render additional electromagnetism of the same polarity. This can be used to augment the magnetic power of the magnets 52 and continuously remagnetize the permanent magnets.

Another consideration with regard to the use of such a power transfer system 80 is that the magnetic fields 50 or 60 generated by both the power transferring device 80 under the countertop or table 20 or the appliance 30 itself must be adequately shielded so that electromagnetic fields or EMF noise can be reduced. This is particularly important in the use of electronic devices 30 such as computers or televisions or monitor displays as shown in FIG. 6, to prevent extraneous electromagnetic fields that may interfere with the proper functioning of the electronic appliance or device 30. This is easily accommodated for by providing shielding in the lower base structure 32 such that electromagnetic field transmitted through the tabletop surface 22 is effectively captured by the appliance 30 or alternatively to insure that the electromagnetic field transmitted through the surface 22 is sufficient to extend only the short distance beyond the countertop or table surface in such a way that it will provide an adequate rotating magnetic field without creating a sufficiently large EMF noise problem for the electronic devices 30. These and other design considerations can be employed in each of the devices 30 as shown. As further noted, each of the appliances 30 can contain a battery-charging system such that magnetic field sensors can be provided on the appliances for proper positioning, and alternatively each device 30 can have a transformer or step down voltage reduction to insure that the proper current is applied to the motor 70 or other device powering the electronic device or appliance 30. These are commonly understood by those in the business of manufacturing electronic devices and or appliances. And while not considered part of the invention are simply those types of features that are currently employed in such appliances using standard alternating currents which can be added to the appliances or devices 30 of the present invention.

As can be easily appreciated, the present system provides a way of transferring power to any appliance or device commonly used in today's household, residence or businesses.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

The invention claimed is:

1. A power transfer system for cordless appliances or electronic devices comprises:
   a power transferring device for emitting a rotational magnetic field above the surface of a table or countertop; and
   a cordless appliance or electronic device having a base for sitting on a surface of a countertop or table top, the base housing a dynamo for transferring an electric current, the dynamo being driven by the rotating magnetic field.

2. The power transfer system for a cordless appliance or electronic device wherein the power transferring device for powering a cordless appliance or electronic device comprises:
   an electric drive motor having a power driven drive axle;
   a switch for activating the drive motor;
   a rotatable support connected to the drive axle, the rotatable support base having a plurality of magnets positioned about the base;
   a housing for holding the motor and rotatable support base and for attaching to the underside of the table or countertop; and
   wherein upon switching on the motor the rotatable support base rotates about an axis moving the plurality of magnets in a circular motion creating a rotating magnetic field to interact with corresponding members of the cordless appliance/device.

3. The power transfer system for a cordless appliance or electronic device, the cordless appliance or electronic device comprising;
   a base for sitting on a countertop or table;
   a plurality of magnets positioned on a rotatable support housing inside the base;
   a dynamo for generating electric current housed inside the appliance/device and connected to the rotatable support structure; and wherein
   when the appliance or device is positioned over a rotating magnetic field, the rotatable support structure rotates causing the dynamo to generate an electric current to power the appliance or device.

* * * * *